United States Patent [19]

Wischermann et al.

[11] Patent Number: 4,855,826
[45] Date of Patent: Aug. 8, 1989

[54] ZONE PLATE SIGNAL GENERATOR

[75] Inventors: Gerhard Wischermann, Weiterstadt; Hans-Peter Richter, Griesheim, both of Fed. Rep. of Germany

[73] Assignee: BTS Broadcast Television Systems GmbH, Darmstadt, Fed. Rep. of Germany

[21] Appl. No.: 203,477

[22] Filed: Jun. 6, 1988

[30] Foreign Application Priority Data

Jun. 11, 1987 [DE] Fed. Rep. of Germany ....... 3719485

[51] Int. Cl.⁴ ...................... H04N 17/00; H04N 17/02
[52] U.S. Cl. ...................................... 358/139; 358/10
[58] Field of Search ................................. 358/10, 139

[56] References Cited

U.S. PATENT DOCUMENTS

| 4,322,749 | 3/1982 | Weston | 358/139 |
| 4,408,337 | 10/1983 | Pham Van Cang | 377/44 |
| 4,635,096 | 11/1987 | Morgan | 358/139 |

OTHER PUBLICATIONS

BBC Research Department Report; Jul. 1978; "The Zone Plate as a Television Test Pattern".
"The Zone Plate: Its Principles and Applications", by M. Weston; pp. 218–226.
Rec. 601-1 Section 11F: Digital Methods of Transmitting Television Information, pp. 319–321.

Primary Examiner—Howard W. Britton
Assistant Examiner—John K. Peng
Attorney, Agent, or Firm—Frishauf, Holtz, Goodman & Woodward

[57] ABSTRACT

A generator of circular zone plate signals for testing digital television signals, particularly those in circuits conforming with CCIR-Rec. 601, contains counters operating at horizontal and vertical sampling scan frequencies for producing an orthogonal pattern. The phase values generated by ROMs in response to the horizontal and vertical counters are combined additively and then converted into amplitude values by another set of ROMs separately for the luminance and chrominance signals. The counters also drive still another set of PROMs that provide, through a logic circuit, modulation of the luminance signal to show horizontal and vertical frequency markers that can be turned on and off by switches. The horizontal marker PROM also produces chrominance blanking signals for eliminating frequency components above half the sampling frequency.

8 Claims, 1 Drawing Sheet

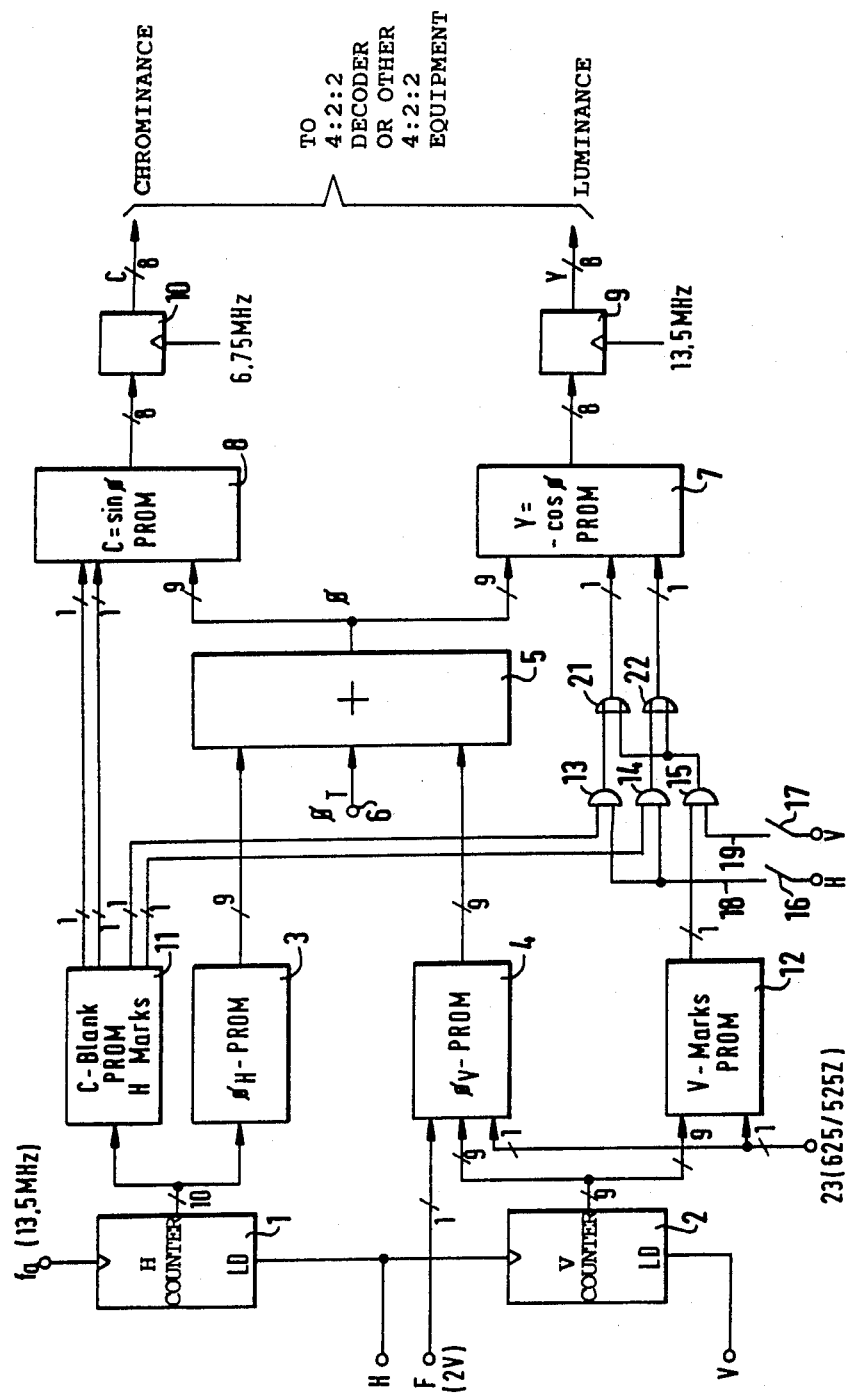

ZONE PLATE SIGNAL GENERATOR

The invention concerns the generator of circular zone plate signals for testing digital television signals, in particular in accordance with CCIR-REC.601.

Such known generators have horizontal frequency counter and a vertical frequency counter for generating an orthogonal raster and ROMs for providing the horizontal and vertical frequency phase values, an addition stage for putting these sets of phase values together and further ROM facilities for converting phase values into amplitude values.

The signals generated by a zone plate generator are test signals that are often used for investigating and experimenting with digital television signals. Full details regarding the characteristics of the zone plate test signal and especially its use in the development of television techniques and refinements are to be found in the article by M. Weston, "The Zone Plate: Its Principals and Applications" published in the periodical EBU Review—Technical, Number 195 of October 1982, pages 218 ff.

A generator of the type of the above described is known from the FIG. 14 diagram on page 7 with the BBC-Research Report (BBC RD 1978/23) of J. O. Drewry, entitled "The Zone Plate As a Television Pattern". In that known circuit the generator can produce only a luminance signal as the zone plate signal and even that signal is not compatible with the CCIR-REC. 601-Standard. Furthermore, in this known zone plate generator no frequency calibration is provided.

From U.S. Pat. No. 4,322,749, a zone plate generator signal is known in which the currently known phase values are produced by means of a so called accumulator circuit. This generator, however, has a very complicated and expensive circuit.

SUMMARY OF THE INVENTION

An object of the present invention to provide a zone plate generator of the above described kind by which a circular zone plate display can be provided for both the luminance and the chrominance transmission in accordance with CCIR-REC. 601-Standard wherein frequency calibration marks can be produced from the display.

Briefly, the output of the addition stage which combines the horizontal and vertical frequency phase values to produce a two dimensional pattern, a first post-addition ROM is provided for generating a luminance signal Y according to the equation $y = -\cos\phi$ and a second post-addition ROM is provided for generating a chrominance signal C in accordance with the equation $C = \sin\phi$. The output signals of these ROMs, after being clocked at appropriate intervals, for example in respective registers, are supplied to a 4:2:2 decoder for bit-parallel digital video signals. The horizontal and vertical frequency counters that drive the phase value PROMs also drive PROMs for providing the calibration marks which can be made to show up on the zone plate pattern by modulating the luminance under control of separate switches for vertical and horizontal marks.

The invention has the advantage that zone plate signals for both luminance and chrominance can be produced which are compatible with the CCIR-Rec. 601 Standard and are obtainable economically. There is a further advantage that both horizontal and vertical frequency marks can be made to show up on the screen for calibration purposes.

BRIEF DESCRIPTION OF THE DRAWINGS

The invention is further described by the way of illustrative example with reference to the annexed drawing, the single FIGURE of which is a block circuit diagram of a zone plate generator according to the invention.

DESCRIPTION OF THE ILLUSTRATED EMBODIMENT

The drawing shows a block circuit diagram of a zone plate generator according to the invention. A pixel counter 1 is loaded with each horizontal pulse and is caused to count at the sampling frequency $f_a$ of 13.5 MHz. A line counter 2, loaded with each of the vertical pulses is made to count the pulses of horizontal frequency. The output signals of the counter 1 (10-bit) and of the counter 2 (9-bit) may be used to produce an orthogonal raster or pattern. A first ROM 3 is connected at the output of the counter 2 and is so programmed that the phase values of the horizontal and vertical wobble signals are generated. On account of the orthogonality of the scanning pattern these phase values can be linearly superposed in a following addition stage 5. It is possible to feed a temporary component, for example a timewise wobble signal or a constant motion frequency through a third input 6 of the addition stage 5.

The output of the addition stage 5 is on the one hand connected to a third ROM 7 for the luminance components Y and on the other hand to a fourth ROM 8 for the chrominance components C. These ROMs 7 and 8 convert the supplied phase values into amplitude values of a cosine function for the luminance Y or a sine function or the chrominance C. The output of the memories 7 and 8 the respective amplitude value signals are available in 8 bit parallel form. These signals then go to the respective D registers 9 and 10 from which they are clocked out at 13.5 MHz for the luminance signal Y and at 6.75 MHz for the chrominance signal C and supplied to a conventional 4:2:2 decoder (not shown) for bit parallel digital video signals conforming to the standard EBU TECHn. 32 46-E. Since according to the CCIR-Rec. 601 Standard the chrominance signal C has only the half band width of the luminance signal Y, the chrominance wobbling is useful only up to half the sampling frequency (i.e. up to 3.37 MHz). Beyond this frequency limit there arise what are known as mirror frequencies which are visible in the picture as alias disturbances. For this reason the chrominance sweep must be blanked out or filtered out at half the sampling frequency. This can be done with two additional bits which are supplied out of the fifth ROM 11 to the fourth ROM 8. With the help of these two bits the blanking out of 100% of the sinusoidal amplitude down to 75%, for example, and from 25% down to 0 is accomplished.

In order to be able to evaluate quantitatively the measurements with the zone plate signals, the frequency markers are a great help. For this purpose in the fifth ROM 11, frequency markers are stored for the horizontal sampling frequency, each of which is a duration of 4 pixels of a line. There are similarly frequency markers for the vertical scanned frequency are stored in a sixth ROM 12 which each have a duration of two lines per picture field. The outputs of these ROMs 11 and 12 are first supplied to respective first inputs of three AND gates 13, 14 and 15 have second inputs respectively connected to switches 16, two of which have second inputs connected to a switch 16 switching the horizontal frequency markers ON and OFF with a line 18 of the third, AND gate 15 has its second input connected through the line 19 to the switch 17 for turning ON and OFF the vertical frequency markers. These AND gates followed by two OR gates 21 and 22, both of which have one input connected to the output AND gate 15 while the respective other inputs of the OR gates 21 and 22 are respectively connected to the outputs of the AND gates 13 and 14. The outputs of the AND gates 21 and 22 each furnish one bit to the ROM 7. By means of the OR gates 21 and 22 correlation of the H and V frequency marker signals is provided. The horizontal frequency markers are made visible by a reduction of the luminance amplitude controlled by two bits, from 100% down to 96% then to 93% and then down to a level of 90%. The vertical frequency markers switch the luminance amplitude directly by one bit from 100% to 90%. Because of the differing numbers of lines of the two standards (625 lines PAL and 525 lines NTSC) the ROMs 4 and 12 is received from the terminal 23 a switch-over signal for switching between the two above named line rates, in order to obtain compatability the vertial wobble signal with the horizontal wobble signal.

Although the invention has been described with reference to a particular illustrative example, it will be understood that modifications and variations are possible within the inventive concept.

We claim:

1. Generator for producing circular zone plate pattern signals for testing digital television signals conforming with CCIR-Rec. 601, including first and second counters for counting at horizontal and vertical scan frequencies respectively to produce an orthogonal raster, first and second ROMs connected to said respective counters for producing horizontal and vertical frequency phase values, means for additively combining said horizontal and vertical frequency phase values, a third ROM connected to said combining means for converting said phase values into amplitude values, and further comprising:
   means in and for said third ROM (7) for producing therefrom a digital luminance signal (Y) according to the equation $Y = -\cos \phi$;
   a fourth ROM (8) connected to said combining means (5) for producing a chrominance signal (C) according to the equation $C = \sin \phi$;
   means (9, 10) connected respectively to said third and fourths ROMs (7,8) for clocking out said luminance and chrominance signals in bit-parallel form, at respective rates conforming to a television signal standard, to an output suitable for connection to a 4:2:2 decoder or other equipment, and
   means connected to outputs of said first and second counters for generating frequency marker signals of horizontal and vertical scan frequency and for modifying the operation of said third ROM so as to superpose frequency marker signals on said luminance signal (Y) as delivered at the output of said third ROM.

2. Generator for producing circular zone plate pattern signals for testing digital television signals conforming with CCIR-Rec. 601, including first and second counters for counting at horizontal and vertical scan frequencies respectively to produce an orthogonal raster, first and second ROMs connected to said respective counters for producing horizontal and vertical frequency phase values, means for additively combining said horizontal and vertical frequency phase values, a third ROM connected to said combining means for converting said phase values into amplitude values, and further comprising:
   means in and for said third ROM (7) for producing therefrom a digital luminance signal (Y) according to the equation $Y = -\cos \phi$;
   a fourth ROM (8) connected to said combining means (5) for producing a chrominance signal (C) according to the equation $C = \sin \phi$;
   means (9, 10) connected respectively to said third and fourths ROMs (7,8) for clocking out said luminance and chrominance signals in bit-parallel form, at respective rates conforming to a television signal standard, to an output suitable for connection to a 4:2:2 decoder or other equipment;
   fifth and sixth ROMs (11, 12) for respectively generating frequency marker signals of horizontal and vertical scan frequency, and
   logic circuit means (13, 14, 15, 21, 22), including additional facilities in said third ROM (7), for applying said frequency marker signals to said third ROM (7) for superposingly inserting them in said luminance signals (Y).

3. Generator as defined in claim 2, wherein said logic circuit means include OR gates (21, 22) respectively connected with two inputs of said ROM (7) which are additional to the input thereof connected to the output of said combining means (5).

4. Generator as defined in claim 3, wherein said logic circuit means also includes AND gates (13, 14, 15), the output of each of which is connected to at least one of said OR gates (21, 22) and wherein one input of each of said AND gates is connected, in the case of two of them, to an output of said fifth ROM (11), and in the case of the third of said AND gates to an output of said sixth ROM (12), and wherein the second input of said two AND gates are connected to a switch (16) for turning on and off said frequency markers signals of horizontal frequency and the second input of said third of said AND gates connected to a switch (17) for turning on and off said frequency marker signals of vertical frequency.

5. Generator as defined in claim 3, wherein means are provided for causing frequency marker signals of horizontal frequency to have a duration of 4 pixels in a television line and for causing said frequency marker signals of vertical frequency to have a duration of two lines in a television picture field.

6. Generator as defined in claim 3, wherein for generation of said frequency marker signals of horizontal frequency, means are provided for supplying two bits (11) from said fifth ROM (11) through said logic circuit means to said third ROM (7) for reducing a luminance amplitude value from 100% to about 96% and thence 93% and to 90% for making said frequency marker signals of horizontal frequency visible.

7. Generator as defined in claim 3, wherein for generating said frequency marker signals of vertical frequency, means are provided for supplying one bit from said sixth ROM (12) through said logic circuit means to said third ROM (7) for reducing a luminance amplitude of 100% to 90% and thereby making said frequency marker signals of vertical frequency visible.

8. Generator as defined in claim 3, wherein the fifth ROM (11) is provided with means for supplying two control bits for reducing the chrominance sine function amplitude from a 100% value to about 75% and thence 25% and to 0 and supplying said control bits to said fourth ROM (8) for blanking out chrominance signals in the output of said fourth ROM beyond half the sampling frequency.

* * * * *